(12) United States Patent
Giesler et al.

(10) Patent No.: US 10,596,672 B2
(45) Date of Patent: Mar. 24, 2020

(54) TOOL TURRET

(71) Applicant: SAUTER FEINMECHANIK GMBH, Metzingen (DE)

(72) Inventors: Steffen Giesler, Albstadt (DE); Kurt Birk, Reutlingen (DE)

(73) Assignee: SAUTER FEINMECHANIK GMBH, Metzingen (DE)

( * ) Notice: Subject to any disclaimer, the term of this patent is extended or adjusted under 35 U.S.C. 154(b) by 5 days.

(21) Appl. No.: 15/778,714

(22) PCT Filed: Nov. 24, 2016

(86) PCT No.: PCT/EP2016/001978
§ 371 (c)(1),
(2) Date: May 24, 2018

(87) PCT Pub. No.: WO2017/092858
PCT Pub. Date: Jun. 8, 2017

(65) Prior Publication Data
US 2018/0345435 A1 Dec. 6, 2018

(30) Foreign Application Priority Data
Dec. 3, 2015 (DE) .................. 10 2015 015 855

(51) Int. Cl.
*B23Q 16/10* (2006.01)
(52) U.S. Cl.
CPC ......... *B23Q 16/102* (2013.01); *B23Q 16/105* (2013.01); *B23Q 2220/002* (2013.01)
(58) Field of Classification Search
CPC ............... B23Q 16/102; B23Q 16/105; B23Q 2200/002
See application file for complete search history.

(56) References Cited

U.S. PATENT DOCUMENTS 5,657,523 A    8/1997   Lin et al.

FOREIGN PATENT DOCUMENTS

| DE | 41 16 774 | 5/1992 |
| DE | 43 08 419 | 9/1994 |
| DE | 299 00 908 | 5/1999 |
| DE | 198 30 629 | 1/2000 |
| DE | 10 2010 021 948 | 12/2011 |
| JP | 2004-25376 | 1/2004 |

OTHER PUBLICATIONS

International Search Report (ISR) dated Feb. 23, 2017 in International (PCT) Application No. PCT/EP2016/001978.

*Primary Examiner* — Alan Snyder
(74) *Attorney, Agent, or Firm* — Wenderoth, Lind & Ponack, L.L.P.

(57) ABSTRACT

A tool turret has a housing (1), a turret head (2) rotatable relative to the housing (1) by a drive. Two toothed rims (4, 9") are arranged coaxial to the rotational axis of the turret head (2). One rim (4) is connected fixedly to the turret head (2). The other rim (9") is connected fixedly to the housing (1). A locking part (24) can be moved axially relative to the housing (1) and to the turret head (2), with the toothing system (24') oriented towards the two toothed rims (4, 9"). In the locked position, the locking part is in engagement with the rims as a positively locking connection. A pressure fluid control actuates the movement of the locking part (24). An additional frictionally locking connection (73) is established between the housing (1) and the turret head (2) by a frictionally locking device (67).

14 Claims, 3 Drawing Sheets

Stand der Technik

TOOL TURRET

FIELD OF THE INVENTION

The invention relates to a tool turret having a housing, a turret head that can be rotated relative to the housing by a drive, and two toothed rims arranged coaxial to the rotational axis of the turret head. One toothed rim is connected fixedly to the turret head. The other toothed rim is connected fixedly to the housing. A locking part can be moved axially relative to the housing and to the turret head, with a tooth system oriented towards the two toothed rims. In its locked position, the locking part is in engagement with the toothed rims as a form-fitting connection. A pressure fluid control activates the movement of the locking part.

BACKGROUND OF THE INVENTION

Tool turrets of this kind are state of the art, as in DE 41 16 774 C1. The operational reliability of machine tools equipped with such tool turrets is to a large degree dependent on the functional reliability of the locking of the turret head. The reliability of the tooth system engagement is particularly inadequate when limited activation force is available for the movement of the locking part formed as a pressure piston, because, for example, for a large effective piston surface of the locking part, as is required for a pneumatic activation, adequate space is not available. In order to ensure reliable locking in spite of low activation force with a limited effective piston surface, the above-mentioned known solution envisages a special tooth form of the tooth system, with a small flank angle and a trapezoidal cross section form of the teeth. This solution is unsatisfactory in particular because that tooth form threatens the reliability of the tooth system engagement due to possible head-to-head contact.

SUMMARY OF THE INVENTION

The problem addressed by the invention is to provide an improved tool turret of the type mentioned above, which tool turret is distinguished by a particularly reliable locking between the turret head and the housing.

According to the invention, this problem is basically solved by a tool turret having, as a significant feature of the invention, in the locked state, an additional frictionally locking connection that is established between the housing and the turret head by a frictionally locking device, in addition to the form-fitting connection. Because the locking engagement is additionally ensured by the simultaneously effective frictional locking, the measures required in the prior art, such as the space requirement-increasing enlargement of the piston surface of the locking part and special tooth forms of the tooth system, which may threaten the reliable tooth system engagement are not required. In the case of low space requirements and reliably realizable shifting operations, a high level of operational reliability of the locking can then be achieved. When the term turret head is used in this application, this term includes tool disks, in particular for tool turrets of machine tools for machining work.

The frictional locking device has in advantageous exemplary embodiments a chamber that can be filled with pressure fluid between the housing and the turret head, with the chamber lying outside of the possible tooth system engagement and with a pressure effective surface. That surface is arranged between the housing and the turret head and establishes the frictional locking when pressure is applied.

The arrangement can be particularly advantageous when the chamber, which can be filled with pressure fluid in the locked state, likewise has pressure fluid applied to it by the pressure fluid control device. This arrangement reduces the construction costs for pressure supply channels extending in the housing by common supply of the locking part and the frictional locking device.

The locking part can be formed as a pressure piston, to which the pressure fluid of the pressure fluid control device can be applied on opposite surfaces. Both the locking engagement and the unlocking then takes place in a pressure-controlled manner and in a particularly operationally reliable manner. Pressure supply channels that are separate from one another can extend in the housing for the pressure supply of the opposite surfaces of the locking part.

In particularly advantageous exemplary embodiments, the housing has an outwardly projecting guiding step, which guiding step is overlapped by the turret head at the edge. The chamber extends at the point of this overlap between the housing and the turret head. When the chamber has the pressure fluid applied to it, the frictional locking between the guiding step of the housing and the turret head can be formed.

The arrangement can be particularly advantageous with the side of the housing lying opposite its tooth system having the chamber continued by a boundary between the turret head and the housing. The boundary forms an effective surface, which in the case of pressure application, draws the turret head in the direction of a step surface of the guiding step, which is adjacent to the tooth system of the turret head and which forms the friction surface.

For the rotatable mounting of the turret head on the housing, on the outerlying guiding surface of the guiding step of the housing at least one bearing can be installed. The rotating turret head is guided along the bearing, while on the free face side thereof a tool disk can be fixed. The tool disk has a plurality of tool receptacles for receiving tools for the machining work.

A further subject of the invention is a Hirth toothing device, which is envisaged in particular for a tool turret.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
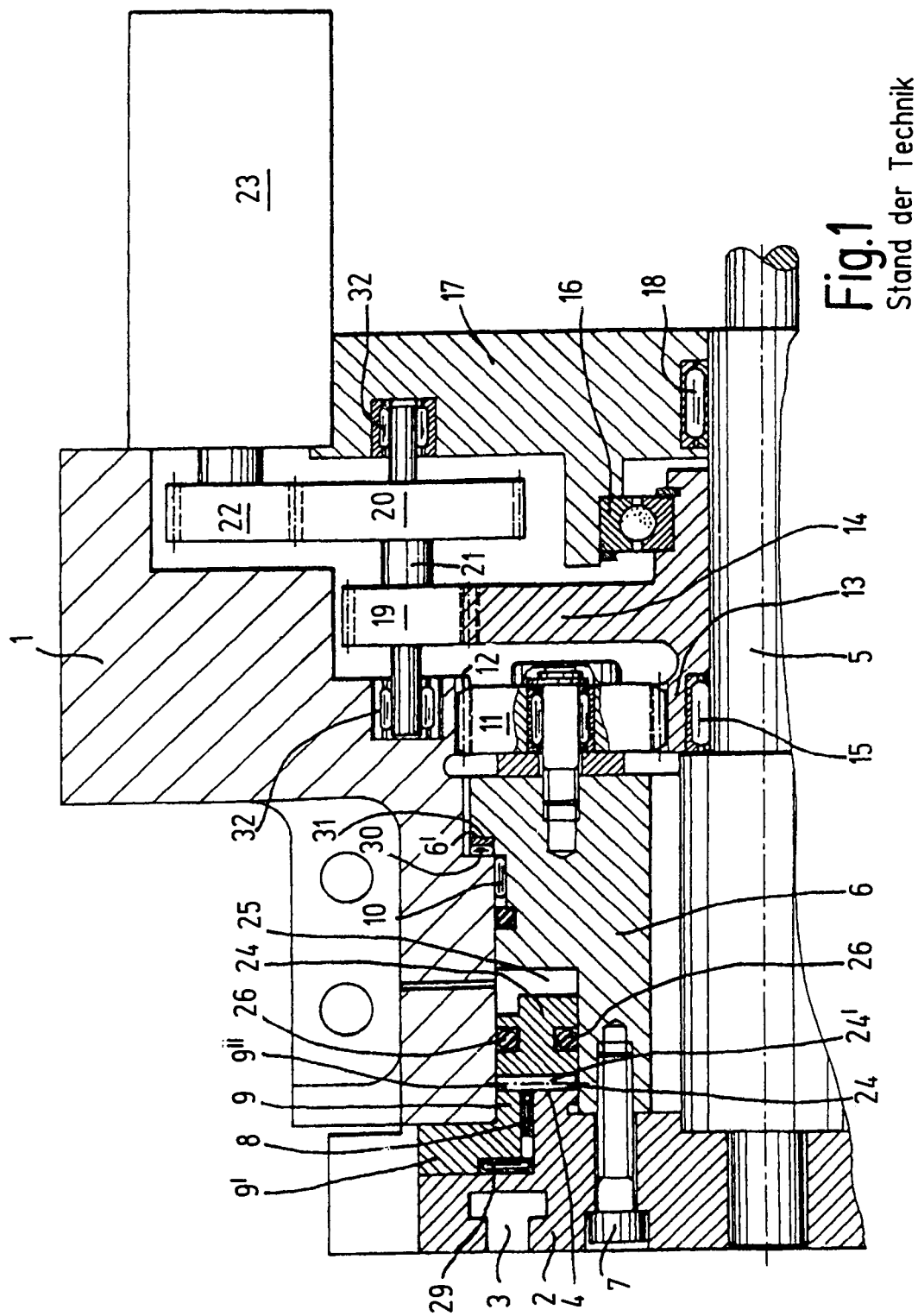
FIG. 1 is a partial and schematically simplified side view in section of a tool turret of the prior art.

FIG. 1 shows the tool turret of DE 41 16 774 C1, with the following text only describing those parts that are relevant to this invention. Furthermore, reference is made to DE 41 16 774 C1. The tool turret has a turret head 2 mounted rotatably in a turret housing 1, which turret head in a known manner is provided with receptacles 3 for tool supports. On the side of the turret head 2 facing the inside of the turret housing 1, a toothed rim 4 is provided, lies concentric to the rotational axis of the turret head 2 and forms a radial tooth system facing the inside of the turret housing 1.

The rotary drive of the turret head 2 for a rotation of the turret housing to one of the selectable angular positions occurs in the depicted, known tool turret indirectly via a centrally arranged shaft 5, by via a hollow cylindrical body 6 concentrically surrounding a portion of the shaft 5. Against the one face end of body 6 the turret head 2 lies. Screws 7 connect the turret head 2 to the hollow cylindrical body 6. The annular material section of the turret head 2 supporting the toothed rim 4 is supported at its outer skin surface via a bearing 8 on a ring 9. Ring 9 is connected to the turret housing 1 and forms a radially outwards extending flange 9'. By a second radial bearing 10, the hollow cylindrical body 6 is rotatably mounted in the turret housing 1.

The rotary drive of the hollow cylindrical body 6 occurs via a planetary gear 11 that, next to its face end facing away from the turret head 2, is rotatably mounted on body 6. This planetary gear 11 cogs both with a toothed rim 12 provided on the turret housing 1 and with a sprocket 13, which has a common hub with a toothed wheel 14 arranged axially next to it. This common hub is mounted on the one hand by a bearing 15 on the shaft 5 and on the other hand by a bearing 16 in a bore of a front wall 17 of the turret housing 1. The rear end section of the shaft 5 is additionally mounted in this front wall 17 by a bearing 18. The toothed wheel 14 is engaged with a sprocket 19, which is fixedly arranged together with a toothed wheel 20 on an auxiliary shaft 21 arranged parallel to the shaft 5. Shaft 5 is mounted rotatably in the turret housing 1 and the front wall 17 by the bearing 32. A sprocket 22 cogs with the toothed wheel 20, which sprocket sits on the shaft of a drive motor 23, which is fixed on the turret housing 1 and on its front wall 17.

The ring 9 fixed on the turret housing 1 forms a second toothed rim 9" in the form of a radial tooth system, the teeth of which form a radial extension of the teeth 28 of the toothed rim 4, when these are oriented towards the teeth of the second toothed rim 9".

For the centering of the turret head 2 and its locking in the selectable angular positions, a locking part in the form of an annular piston 24 is provided. The inner skin surface of piston 24 is aligned with the inner skin surface of the toothed rim 4 and the outer skin surface of the second toothed rim 9". Both toothed rims 28, 9" project into the annular work space 25 from the one face side thereof, in which space 25 the piston 24 is arranged in an axially displaceable manner. As FIG. 1 shows, the annular work space 25 is delimited on the inside and on the end facing away from the turret head 2 by a groove-shaped turned recess of the hollow cylindrical body 6 and on the outside by the inner skin surface of the turret housing 1.

The piston 24 is provided both at its outer skin surface and at its inner skin surface with a respective annular groove for receiving a ring seal 26, and has on the face side facing the toothed rim 4 and the second toothed rim 9" a radial tooth system 24' formed corresponding to the tooth systems of the two toothed rims 4 and 9" in order that the turret head 2 can be exactly positioned in each selectable angle position and can be locked in a substantially play-free manner to the turret housing 1.

Figure 2:
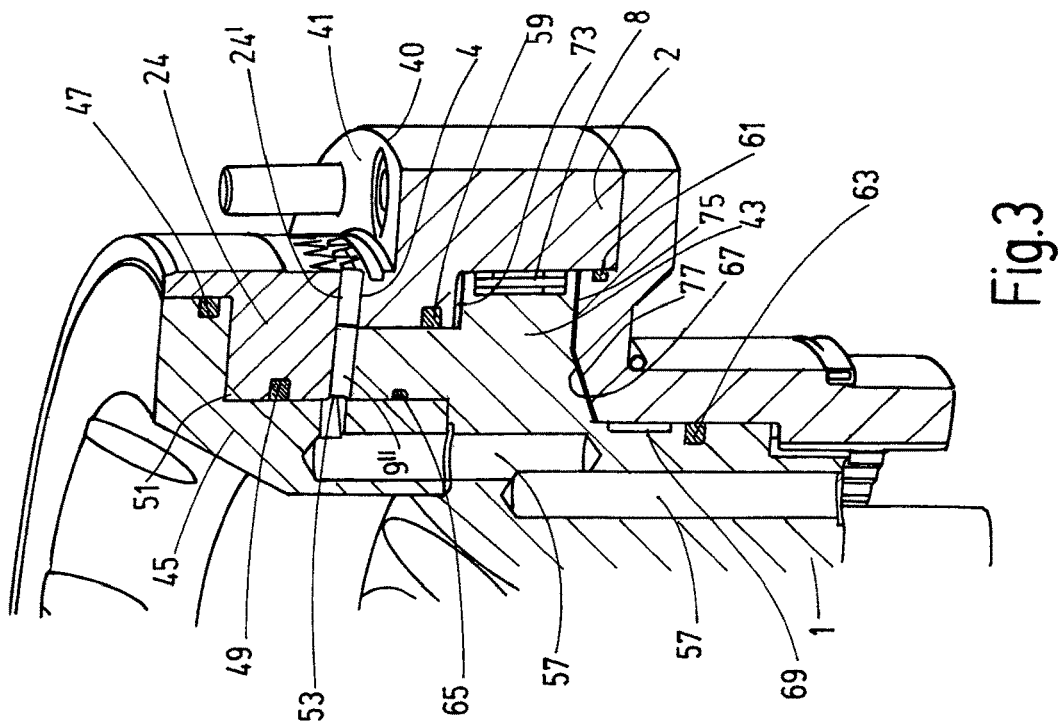
FIG. 2 is a schematically simplified and partial perspective view in section of a tool turret according to an exemplary embodiment of the invention, with the partial area adjacent to the locking device between the housing and the turret head being depicted.
Figure 3:
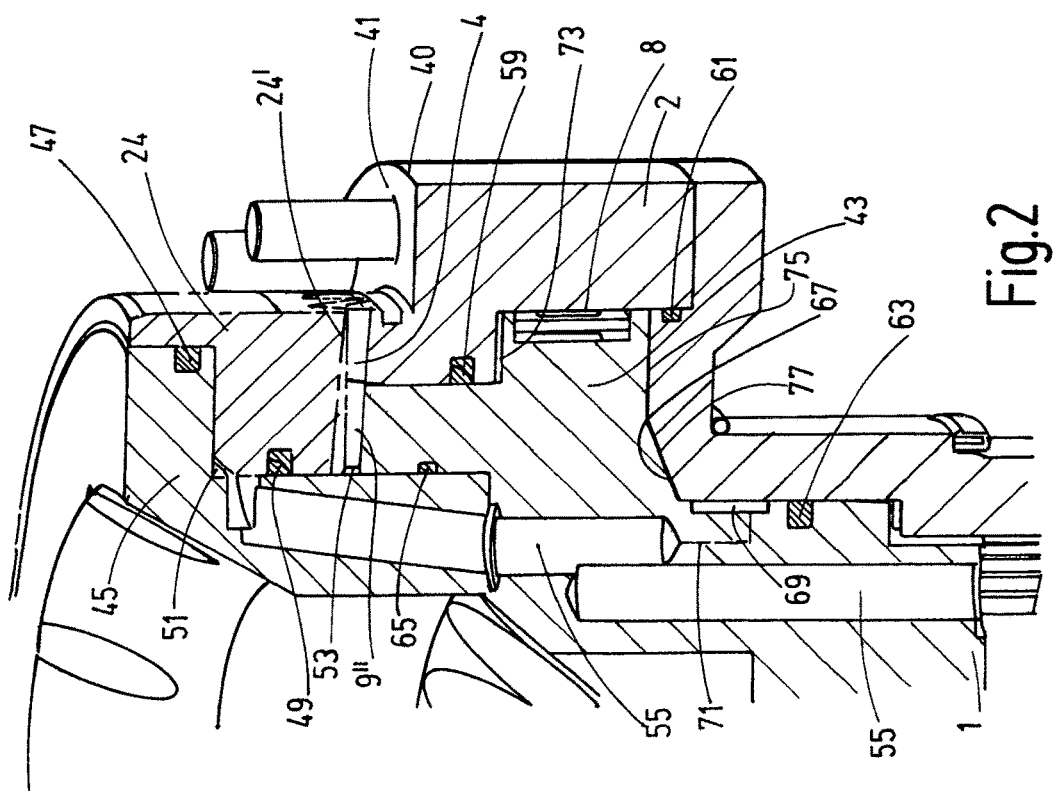
FIG. 3 is a schematically simplified and partial perspective view of the tool turret of FIG. 2, with a cutting plane rotated relative to FIG. 2.
Figure 4:
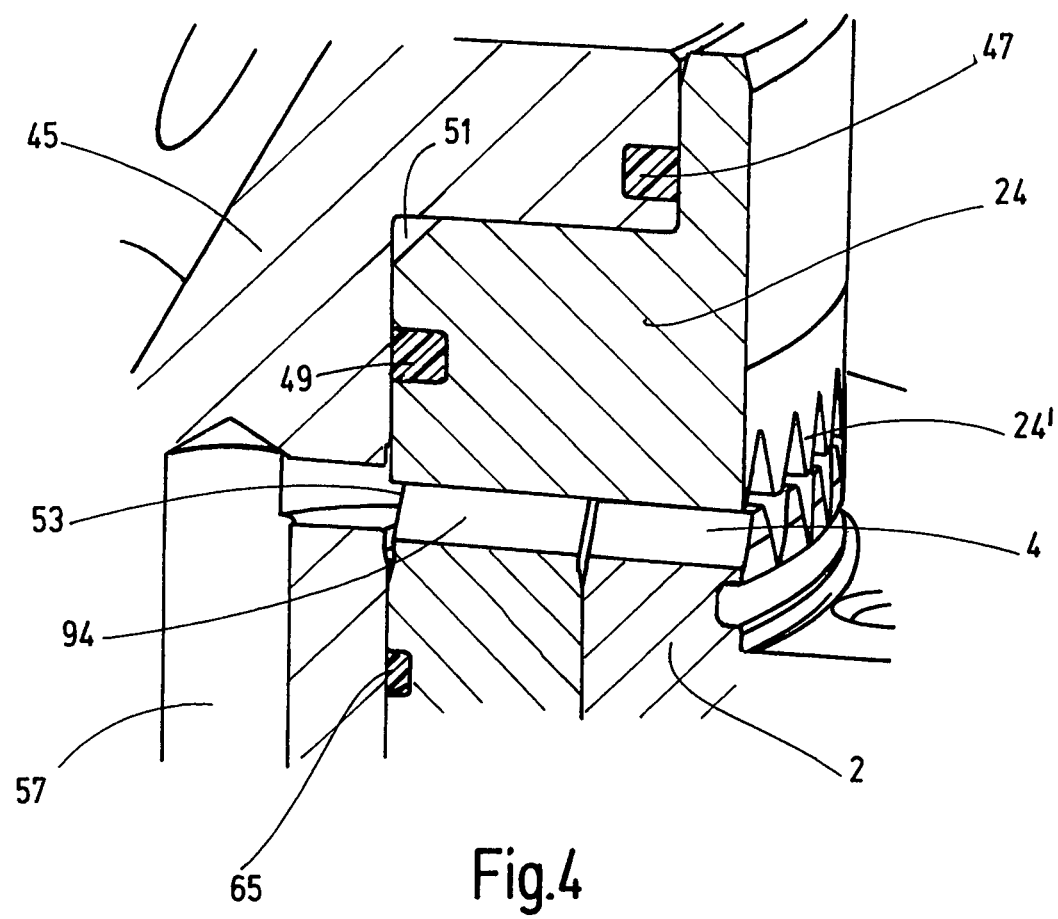
FIG. 4 is an enlarged partial perspective view cutout from FIG. 3.

Relative to the exemplary embodiment of the tool turret according to the invention, FIGS. 2 to 4 depict only the partial area adjacent to the locking device 5 between the housing 1 and the turret head 2. The tool disk having receptacles for tool supports is omitted, which tool disk is mounted on a contact surface 41 at the outer ring flange 40 of the turret head 2. This turret head 2 overlaps a guiding step 43 extending radially outwards from the housing 1. At the external circumference of housing 1, a radial bearing 8 guides the turret head 2 in its rotational movement around the housing 1.

In FIGS. 2 to 4 the locking device is shown in the unlocked position, in which the locking part in the form of the pressure piston 24 with its radial tooth system 24' is raised from the tooth system on the toothed rim 4 of the turret head 2 and from the tooth system on the toothed rim 9" of the housing 1. The pressure piston 24 is displaceable in an annular body 45 of the housing 1 that forms a cylinder sleeve and is sealed relative to annular body 46 by sealing rings 47 and 49, so that on both axially opposite sides of pressure chambers 51 and 53 of piston 24 are formed. The piston 24 can then be displaced by pressure fluid supply between the unlocked position and the locked position. FIG. 2 shows the connection of a pressure supply channel 55 extending in the housing 1 to the pressure chamber 51. FIG. 3 shows the connection of a second pressure supply channel 57 to the pressure chamber 53 on the side of the piston 24 having the tooth system 24'.

The guiding step 43 of the housing 1 is sealed by sealing rings 59, 61 and 63 relative to the turret head 2 and by a sealing ring 65 relative to the annular body 45. It is then possible to form, on the external circumference of the guiding step 43 and of the wall area connected thereto, a pressure chamber 67. By a pocket 69 and a branch pipe 71, pressure fluid from the supply channel 55 can be applied to pressure chamber 67, when the pressure fluid control device during shifting to the locked state supplies the supply channel 55 with pressure fluid. With the depicted geometry of the guiding step 43, in which a slanted limitation surface 77 of the turret head 2 connects to the step surfaces 73 and 75 of the guiding step 43, this surface 77 forms, in the case of pressure application to the pressure chamber 67, a pressure effective surface, which at the turret head 2 generates a force component downwards (viewing direction according to the drawings), because the pressure effectiveness of the opposite step surfaces 73 and 75 is cancelled out. The turret head 2 is then braced against the top step surface 73 of the guiding step 43, so that in the locked position under the influence of the fluid pressure a frictional locking is formed on the step surface 73 between the turret head 2 and the guiding step 43 of the housing part 1. In the thus formed additional rotation lock, there is no need for additional measures to ensure the engagement of the Hirth toothing. No space for auxiliary devices is then required and the tooth shape of the Hirth toothing can be freely selected for optimal tooth engagement in the shifting operations.

While one embodiment has been chosen to illustrate the invention, it will be understood by those skilled in the art that various changes and modifications can be made therein without departing from the scope of the invention as defined in the claims.

The invention claimed is:
1. A tool turret, comprising:
a turret housing;
a turret head rotatable about a rotational axis relative to said turret housing by a drive;

first and second toothed rims being coaxial to said rotational axis and being fixedly connected to said turret head and said turret housing, respectively;

a locking part being movable axially relative to said turret housing and said turret head along said rotational axis, having a set of locking teeth oriented toward said first and second toothed rims and being movable between unlocked and locked positions, in the locked position teeth of said toothed rims being engaged with said locking teeth in a form-fitting connection;

a pressure fluid control activating movement of said locking part between the unlocked and locked positions; and a frictional lock forming a frictional locking connection between said turret head and said turret housing in the locked position in addition to connection of said teeth of said first and second toothed rims with said locking teeth of said locking part, said frictional lock including a chamber between said turret housing and said turret head, said chamber being fillable with a pressure fluid, lying outside of the connection of said teeth of said first and second toothed rims with said locking teeth of said locking part and having a pressure effective surface arranged between said turret housing and said turret head that produces said frictional locking upon fluid pressure being applied to said chamber.

2. A tool turret according to claim 1 wherein
said chamber is Tillable with fluid pressure from said pressure fluid control.

3. A tool turret according to claim 1 wherein
said locking part is a pressure piston capable of having pressure fluid of said pressure fluid control applied to opposite surfaces of said pressure piston.

4. A tool turret according to claim 3 wherein
pressure supply channels separate from one another extend in said turret housing and open respectively on said opposite surfaces of said pressure piston to control movement of said pressure piston.

5. A tool turret according to claim 1 wherein
said turret housing comprises a projecting guiding step overlapped by said turret head at an edge of said guiding step, said chamber extending at said edge.

6. A tool turret according to claim 5 wherein
said chamber is continued by a boundary between said turret head and said turret housing on a side of said turret housing opposite said second toothed rim, said boundary forming an effective surface when fluid pressure is applied to said chamber drawing said turret head in a direction of a step surface of said guiding step, said step surface being adjacent said first toothed rim.

7. A tool turret according to claim 5 wherein
a bearing is mounted on an outside guiding surface of said guiding step.

8. A tool turret according to claim 1 wherein
a tool disk is capable of being fixed with a plurality of tool receptacles for receiving machining tools on free side face of said tool turret.

9. A tool turret, comprising:
a turret housing;
a turret head rotatable about a rotational axis relative to said turret housing by a drive;
first and second toothed rims being coaxial to said rotational axis and being fixedly connected to said turret head and said turret housing, respectively;
a locking part being movable axially relative to said turret housing and said turret head along said rotational axis, having a set of locking teeth oriented toward said first and second toothed rims and being movable between unlocked and locked positions, in the locked position teeth of said toothed rims being engaged with said locking teeth in a form-fitting connection;
a pressure fluid control activating movement of said locking part between the unlocked and locked positions;
a frictional lock forming a frictional locking connection between said turret head and said turret housing in the locked position in addition to connection of said teeth of said first and second toothed rims with said locking teeth of said locking part; and
a projecting guiding step on said turret housing overlapped by said turret head at an edge of said guiding step, said chamber extending at said edge, said chamber being continued by a boundary between said turret head and said turret housing on a side of said turret housing opposite said second toothed rim, said boundary forming an effective surface when fluid pressure is applied to said chamber drawing said turret head in a direction of a step surface of said guiding step, said step surface being adjacent said first toothed rim.

10. A tool turret according to claim 9 wherein
said chamber is Tillable with fluid pressure from said pressure fluid control.

11. A tool turret according to claim 9 wherein
said locking part is a pressure piston capable of having pressure fluid of said pressure fluid control applied to opposite surfaces of said pressure piston.

12. A tool turret according to claim 11 wherein
pressure supply channels separate from one another extend in said turret housing and open respectively on said opposite surfaces of said pressure piston to control movement of said pressure piston.

13. A tool turret according to claim 9 wherein
a bearing is mounted on an outside guiding surface of said guiding step.

14. A tool turret according to claim 9 wherein
a tool disk is capable of being fixed with a plurality of tool receptacles for receiving machining tools on free side face of said tool turret.

* * * * *